United States Patent
Kim et al.

(10) Patent No.: US 9,510,252 B2
(45) Date of Patent: Nov. 29, 2016

(54) METHOD AND APPARATUS FOR SELECTING CELL IN WIRELESS COMMUNICATION SYSTEM

(71) Applicant: LG ELECTRONICS INC., Seoul (KR)

(72) Inventors: Sangwon Kim, Anyang-si (KR); Youngdae Lee, Anyang-si (KR); Sunghoon Jung, Anyang-si (KR); Sungjun Park, Anyang-si (KR); Seungjune Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 139 days.

(21) Appl. No.: 14/386,405

(22) PCT Filed: Apr. 24, 2013

(86) PCT No.: PCT/KR2013/003504
§ 371 (c)(1),
(2) Date: Sep. 19, 2014

(87) PCT Pub. No.: WO2013/162277
PCT Pub. Date: Oct. 31, 2013

(65) Prior Publication Data
US 2015/0043533 A1    Feb. 12, 2015

Related U.S. Application Data

(60) Provisional application No. 61/637,825, filed on Apr. 24, 2012.

(51) Int. Cl.
*H04W 4/00* (2009.01)
*H04W 36/00* (2009.01)
*H04W 48/20* (2009.01)
*H04W 8/18* (2009.01)
*H04W 76/06* (2009.01)

(52) U.S. Cl.
CPC .......... *H04W 36/0083* (2013.01); *H04W 8/18* (2013.01); *H04W 48/20* (2013.01); *H04W 76/06* (2013.01)

(58) Field of Classification Search
CPC ... H04W 36/00; H04W 88/06; H04W 36/08; H04W 80/04
USPC ....... 370/329, 328, 432, 464, 235, 252, 254, 370/400, 444; 455/515, 509, 450, 435.2, 455/550.1
See application file for complete search history.

(56) References Cited

U.S. PATENT DOCUMENTS

| | | | |
|---|---|---|---|
| 7,027,811 B2 | 4/2006 | Pedlar | |
| 7,363,047 B2* | 4/2008 | Yi | .......... H04W 76/02 370/400 |
| 7,450,942 B2 | 11/2008 | Cho et al. | |
| 2010/0240367 A1* | 9/2010 | Lee | .......... H04W 36/0077 455/435.2 |

* cited by examiner

Primary Examiner — Chi H Pham
Assistant Examiner — Alexander O Boakye
(74) Attorney, Agent, or Firm — Birch, Stewart, Kolasch & Birch, LLP

(57) ABSTRACT

A method and apparatus for selecting a cell in a wireless communication system is provided. A user equipment (UE) receives a radio resource control (RRC) connection release message including redirection information from a serving cell. The UE determines whether to ignore the redirection information in the RRC connection release message according to a release cause of an RRC connection release and a user preference between a unicast service and a multimedia broadcast/multicast service (MBMS) service. If it is determined to ignore the redirection information, the UE ignores the redirection information in the RRC connection release message.

13 Claims, 6 Drawing Sheets

METHOD AND APPARATUS FOR SELECTING CELL IN WIRELESS COMMUNICATION SYSTEM

CROSS REFERENCE TO RELATED APPLICATIONS

This application is the National Phase of PCT/KR2013/003504 filed on Apr. 24, 2013, which claims priority under 35 U.S.C. 119(e) to U.S. Provisional Application No. 61/637,825 filed on Apr. 24, 2012, all of which are hereby expressly incorporated by reference into the present application.

TECHNICAL FIELD

The present invention relates to wireless communications, and more particularly, to a method and apparatus for selecting a cell in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

A cell reselection procedure may be performed in the 3GPP LTE. The cell reselection procedure allows a user equipment (UE) to select a more suitable cell and camp on it. The UE shall attempt to detect, synchronize, and monitor intra-frequency, inter-frequency and inter-radio access technology (RAT) cells indicated by a serving cell. That is, when camped on a cell, the UE shall regularly search for a better cell according to a cell reselection criteria. If a better cell is found, that cell is selected. The change of cell may imply a change of RAT.

The 3GPP LTE can provide a multimedia broadcast/multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

Generally, a UE in a radio resource control (RRC) idle state (RRC_IDLE) may perform an inter-frequency cell reselection procedure based on frequency priorities set by a network. If the UE wants to receive the MBMS service provided by the 3GPP LTE, the UE may perform the cell reselection procedure by setting a priority of a specific frequency providing the MBMS service to the highest priority by itself. When the UE which is interested in the MBMS service is released from the serving cell, the UE may be redirected to a frequency not providing the MBMS service even though the UE is interested with receiving the MBMS service.

A method for guaranteeing an MBMS service continuity for the UE which is interested in the MBMS service is required.

SUMMARY OF INVENTION

Technical Problem

The present invention provides a method and apparatus for selecting a cell in a wireless communication system. The present invention provides a method for determining whether to ignore redirection information or not for receiving a multimedia broadcast/multicast service (MBMS) service when a network indicates a user equipment to redirect to other radio access technology (RAT).

Solution to Problem

In an aspect, a method for selecting, by a user equipment (UE), a cell in a wireless communication system is provided. The method includes receiving a radio resource control (RRC) connection release message including redirection information from a serving cell, determining whether to ignore the redirection information in the RRC connection release message according to a release cause of an RRC connection release and a user preference between a unicast service and a multimedia broadcast/multicast service (MBMS) service.

The method may further include ignoring the redirection information in the RRC connection release message, and selecting a cell on a 3rd generation partnership project (3GPP) long-term evolution (LTE) frequency if it is determined to ignore the redirection information.

In another aspect, a user equipment (UE) in a wireless communication system is provided. The UE includes a radio frequency (RF) unit for transmitting or receiving a radio signal, and a processor coupled to the RF unit, and configured for receiving a radio resource control (RRC) connection release message including redirection information from a serving cell, determining whether to ignore the redirection information in the RRC connection release message according to a release cause of an RRC connection release and a user preference between a unicast service and a multimedia broadcast/multicast service (MBMS) service.

Advantageous Effects of Invention

A user equipment (UE) can receive an MBMS service continuously even if a network indicates the UE to redirect to other RAT.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
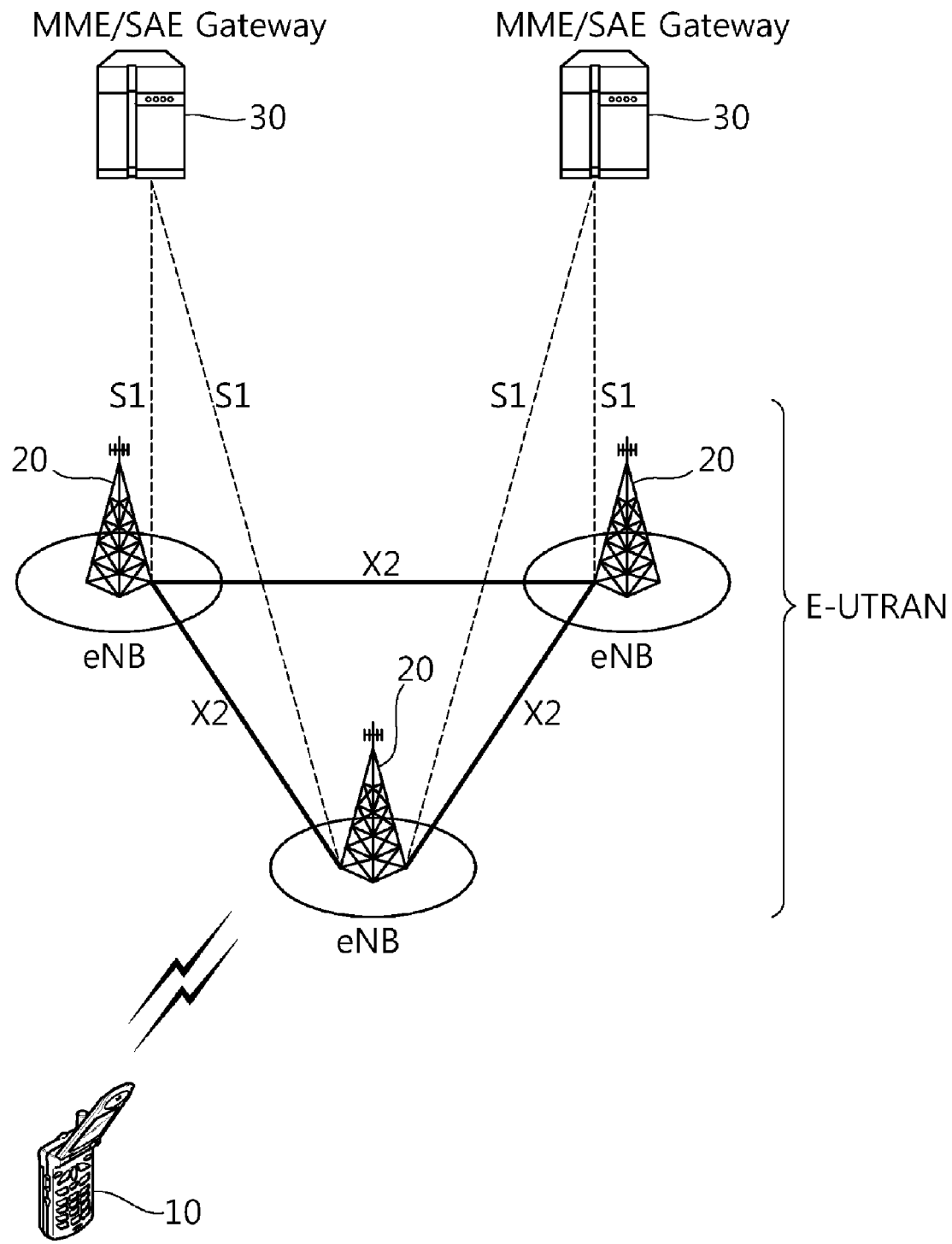
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
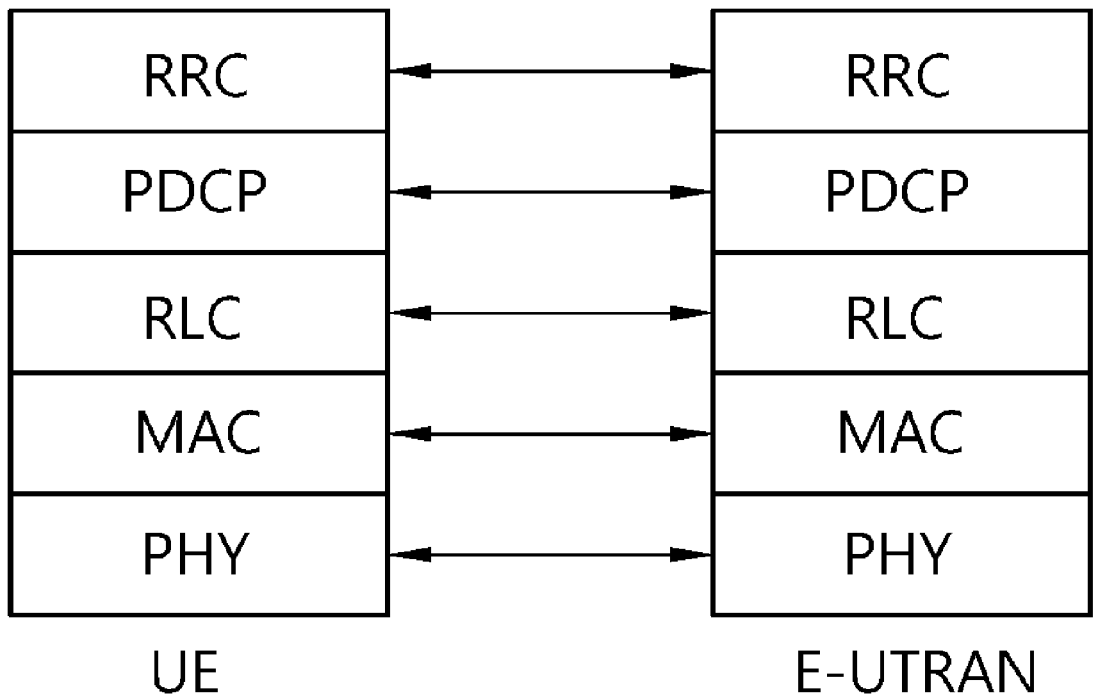
FIG. 2 is a diagram showing a radio interface protocol architecture for a control plane.
Figure 3:
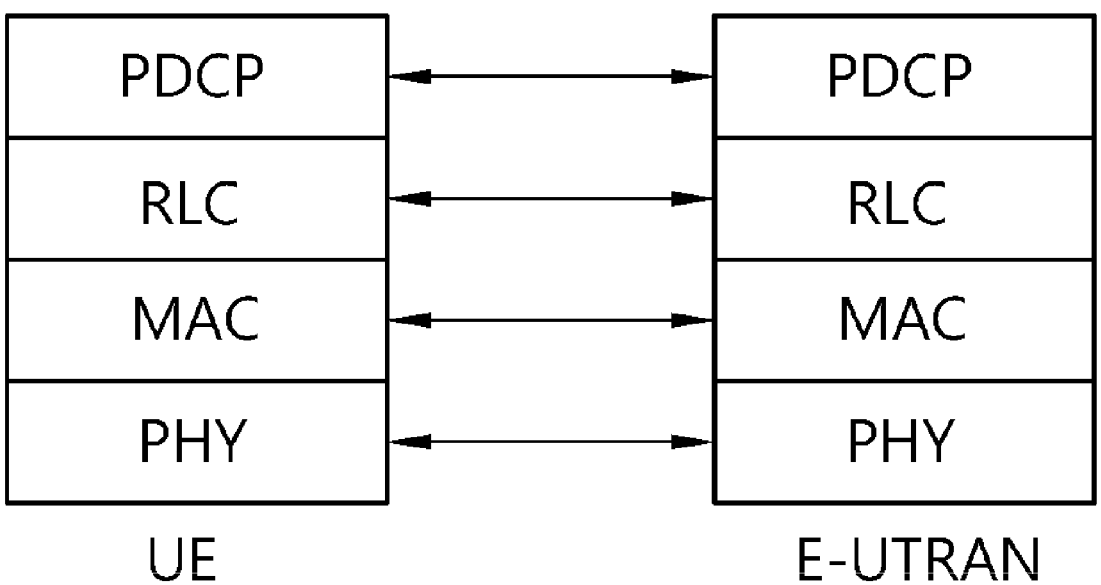
FIG. 3 is a diagram showing a radio interface protocol architecture for a user plane.

FIG. 2 is a diagram showing a radio interface protocol architecture for a control plane. FIG. 3 is a diagram showing a radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
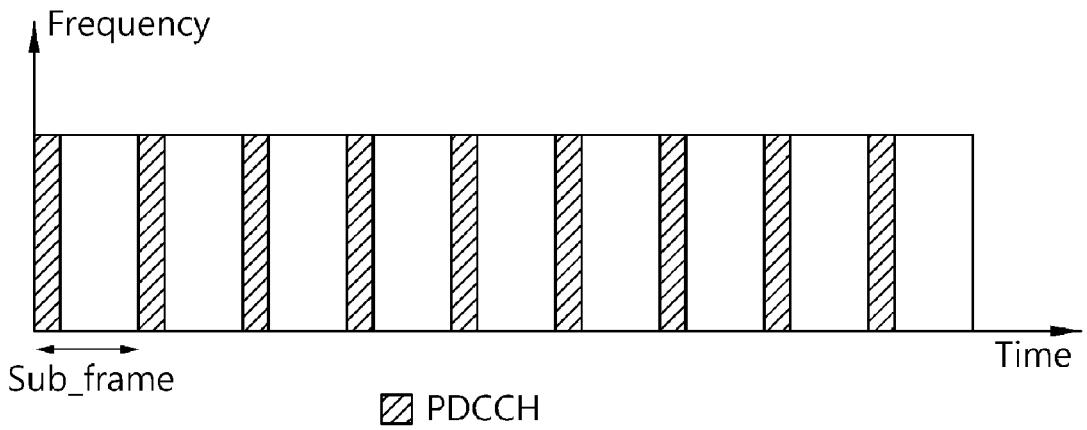
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

An RRC state indicates whether the RRC of the UE is logically connected to the RRC of the E-UTRAN. When an RRC connection is established between an RRC layer of the UE and an RRC layer of the network, the UE is in an RRC connected state (RRC_CONNECTED), and otherwise the UE is in an RRC idle state (RRC_IDLE). Since the UE in the RRC_CONNECTED has the RRC connection established with the E-UTRAN, the E-UTRAN can recognize the existence of the UE in the RRC_CONNECTED and can effectively control the UE. Meanwhile, the UE in the RRC_IDLE cannot be recognized by the E-UTRAN, and a core network (CN) manages the UE in unit of a tracking area (TA) which is a larger area than a cell. That is, only the existence of the UE in the RRC_IDLE is recognized in unit of a large area, and the UE must transition to the RRC_CONNECTED to receive a typical mobile communication service such as voice or data communication.

When the user initially powers on the UE, the UE first searches for a proper cell and then remains in the RRC_IDLE in the cell. When there is a need to establish an RRC connection, the UE which remains in the RRC_IDLE may establish the RRC connection with the RRC of the E-UTRAN through an RRC connection procedure and then may transition to the RRC_CONNECTED. The UE which remains in the RRC_IDLE may need to establish the RRC connection with the E-UTRAN when uplink data transmission is necessary due to a user's call attempt or the like or when there is a need to transmit a response message upon receiving a paging message from the E-UTRAN.

A non-access stratum (NAS) layer belongs to an upper layer of the RRC layer and serves to perform session management, mobility management, or the like. To manage mobility of the UE in the NAS layer, two states, i.e., an EPS mobility management (EMM)-REGISTERED state and an EMM-DEREGISTERED state, can be defined. The two states are applicable to the UE and the MME. The UE is initially in the EMM-DEREGISTERED state. To access the network, the UE may perform a process of registering to the network through an initial attach procedure. If the initial attach procedure is successfully performed, the UE and the MME may be in the EMM-REGISTERED state.

In addition, to manage a signaling connection between the UE and the EPC, two states, i.e., an EPS connection management (ECM)-IDLE state and an ECM-CONNECTED state, can be defined. The two states are applicable to the UE and the MME. When the UE in the ECM-IDLE state establishes an RRC connection with the E-UTRAN, the UE may be in the ECM-CONNECTED state. When the MME in the ECM-IDLE state establishes an S1 connection with the E-UTRAN, the MME may be in the ECM-CONNECTED state. When the UE is in the ECM-IDLE state, the E-UTRAN does not have information on the context of the UE. Therefore, the UE in the ECM-IDLE state can perform a UE-based mobility related procedure such as cell selection or cell reselection without having to receive a command of the network. If a location of the UE in the ECM-IDLE state becomes different from a location known to the network, the UE may report the location of the UE to the network through a tracking area update procedure. On the other hand, the mobility of the UE in the ECM-CONNECTED state may be managed by the command of the network.

In general, a service provided by a network to a UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a normal service in this cell. This cell satisfies a condition of an acceptable cell, and also satisfies additional conditions. Regarding the additional conditions, this cell has to belong to a public land mobile network (PLMN) to which the UE can access, and a tracking area update procedure of the UE must not be barred in this cell. If a specific cell is a closed subscriber group (CSG) cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Figure 5:
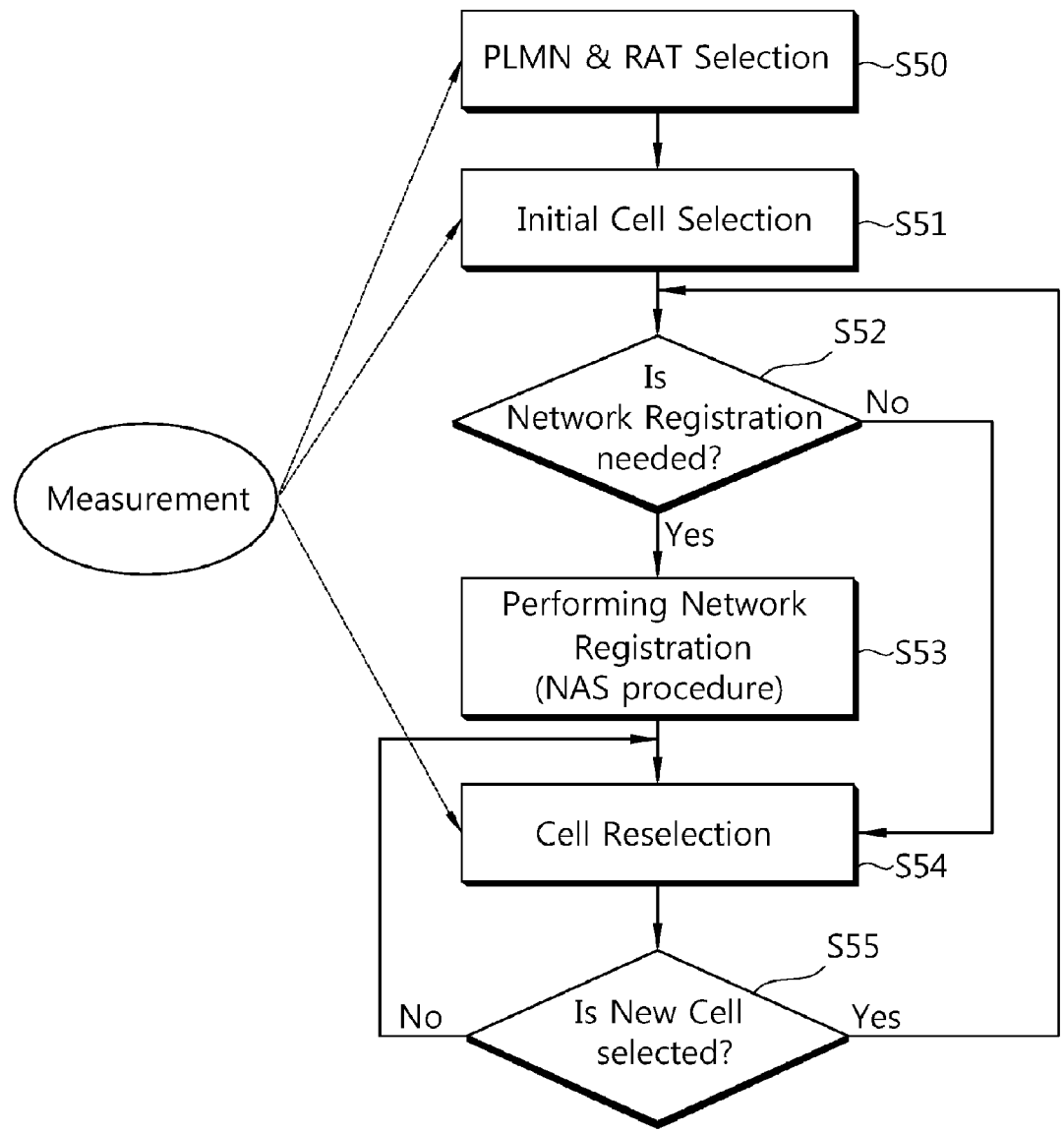
FIG. 5 shows an example of an operation of a UE an RRC_IDLE.

FIG. 5 shows an example of an operation of a UE in RRC_IDLE. It is illustrated in FIG. 5 that a procedure of registering a network through a cell selection and performing a cell reselection if needed after the UE is initially turned on.

Referring the FIG. 5, a UE selects a radio access technology (RAT) for communicating with a PLMN from which the UE intends to be served at step S50. Information about the PLMN and the RAT may be selected by the UE. The UE may use information stored in a universal subscriber identity module (USIM).

The UE selects a highest cell among a measured BS and cells having higher quality than a predetermined value at step S51. This procedure is referred as an initial cell selection procedure, and performed by a UE turned on. The cell selection procedure will be described in the following. After the cell selection, the UE periodically receives system information from the BS. The predetermined value is a value defined in a communication system for ensuring a physical signal quality in data transmission/reception. Therefore, the predetermined value may vary with a RAT to which the each predetermined value is applied.

The UE determines whether to perform a network registration procedure at step S52. The UE performs a network registration procedure if needed at step S53. The UE registers self information (i.e. IMSI) for being served by the network (i.e. paging). The UE does not register whenever the UE selects a cell. When the UE's own information about the network, e.g., a tracking area identity (TAI), is different from information about the network provided from the system information, the UE performs the network registration procedure.

If a value of signal strength or signal quality measured from a BS serving the UE is lower than a value measured from a BS of neighbor cell, the UE may select one of other cells providing a better signal characteristic than the BS serving the UE. This procedure is referred as a cell reselection procedure, which is distinguished from the initial cell selection procedure. There may be a temporal constraint for preventing the UE from performing the cell reselection procedure frequently according to a change of a signal characteristic. The cell reselection procedure will be described in the following.

The UE performs a cell reselection procedure at step S54. The cell reselection procedure will be described below. If the new cell is selected, the UE may perform procedures described in step S52. If the new cell is not selected, the UE may perform the cell reselection procedure again.

A cell selection procedure is described in detail.

If a UE is turned on or is camped on a cell, the UE may perform procedures in order to receive a service by selecting a cell having suitable quality.

The UE in an RRC_IDLE needs to be ready to receive the service through the cell by selecting the cell having suitable quality all the time. For example, the UE that has been just turned on must select the cell having suitable quality so as to be registered into a network. If the UE that has stayed in an RRC_CONNECTED enters into the RRC_IDLE, the UE must select a cell on which the UE itself is camped. As such, a procedure of selecting a cell satisfying a certain condition by the UE in order to stay in a service waiting state such as the RRC_IDLE is called a cell selection. The cell selection is performed in a state that the UE does not currently determine a cell on which the UE itself is camped in the RRC_IDLE, and thus it is very important to select the cell as quickly as possible. Therefore, if a cell provides radio signal quality greater than or equal to a predetermined level, the cell may be selected in the cell selection procedure even though the cell is not a cell providing best radio signal quality.

Hereinafter, a method and procedure for selecting a cell by a UE in 3GPP LTE is described in detail. If power is initially turned on, the UE searches for available PLMNs and selects a suitable PLMN to receive a service. Subsequently, the UE selects a cell having a signal quality and property capable of receiving a suitable service among the cells provided by the selected PLMN.

The UE shall use one of the following two cell selection procedures:

1) Initial cell selection: This procedure requires no prior knowledge of which RF channels are E-UTRA carriers. The UE shall scan all RF channels in the E-UTRA bands according to its capabilities to find a suitable cell. On each carrier frequency, the UE need only search for the strongest cell. Once a suitable cell is found, this cell shall be selected.

2) Stored information cell selection: This procedure requires stored information of carrier frequencies and optionally also information on cell parameters, from previously received measurement control information elements or from previously detected cells. Once the UE has found a suitable cell, the UE shall select it. If no suitable cell is found, the initial cell selection procedure shall be started.

If the UE selects a cell satisfying a cell selection criterion, the UE receives information, from system information of the selected cell, needed for an RRC_IDLE operation of the UE in the selected cell. Upon receiving all information needed for the RRC_IDLE operation of the UE, the UE waits in the RRC_IDLE in order to request a service to a network (e.g., originating call) or to receive a service from a network (e.g., terminating call).

A cell reselection procedure is described in detail.

After a UE selects a certain cell through a cell selection procedure, the signal strength and quality between the UE and a BS may be changed due to a change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This procedure is called a cell reselection. A basic purpose of the cell reselection procedure is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection procedure.

As described above, there is a method of selecting or reselecting a cell based on the signal property of the wireless environment. When a cell is reselected in the cell reselection procedure, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

Generally, the cell reselection procedure is as follows.

1) The UE receives parameters for the cell reselection procedure from the BS.

2) The UE measures quality of a serving cell and a neighboring cell for a cell reselection.

3) The cell reselection procedure is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having the highest priority. The network may provide the same frequency priority to be commonly applied to UEs in a cell by using broadcast signaling or may provide a frequency-specific priority to each UE by using dedicated signaling for each UE. The cell reselection priority provided by the broadcast signaling may be referred to as a common priority. The cell reselection priority to which the network assigns for each UE may be referred to as a dedicated priority. When the UE receives the dedicated priority, the UE also receives a validity time of the dedicated priority together. Upon receiving the dedicated priority, the UE starts a validity timer set to the received validity time. While the validity timer operates, the UE applies the dedicated priority in the RRC_IDLE. When the validity timer expires, the UE deletes the dedicated priority, and accordingly, applies to the common priority.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

A reselection priorities handling is described. It may refer to a section 5.2.4.1 of 3GPP TS 36.304 V10.5.0 (March 2012).

Absolute priorities of different E-UTRAN frequencies or inter-RAT frequencies may be provided to the UE in the system information, in the RRCConnectionRelease message, or by inheriting from another RAT at inter-RAT cell (re)selection. In the case of system information, an E-UTRAN frequency or inter-RAT frequency may be listed without providing a priority (i.e. the field cellReselectionPriority is absent for that frequency). If priorities are provided in dedicated signaling, the UE shall ignore all the priorities provided in the system information. If UE is in "camped on any cell" state, the UE shall only apply the priorities provided by the system information from current cell, and the UE preserves priorities provided by dedicated signaling unless specified otherwise. When the UE in "camped normally" state, has only dedicated priorities other than for the current frequency, the UE shall consider the current frequency to be the lowest priority frequency (i.e. lower than the eight network configured values). While the UE is camped on a suitable CSG cell, the UE shall always consider the current frequency to be the highest priority frequency (i.e. higher than the eight network configured values), irrespective of any other priority value allocated to this frequency. If the UE has knowledge on which frequency a multimedia broadcast multicast service (MBMS) service of interest is provided, it may consider that frequency to be the highest priority during the MBMS session. The UE shall delete priorities provided by dedicated signaling when:

the UE enters RRC_CONNECTED state; or the optional validity time of dedicated priorities (T320) expires; or a PLMN selection is performed on request by NAS.

The UE shall only perform cell reselection evaluation for E-UTRAN frequencies and inter-RAT frequencies that are given in the system information and for which the UE has a priority provided. The UE shall not consider any black listed cells as candidate for cell reselection. The UE shall inherit the priorities provided by dedicated signaling and the remaining validity time (i.e., T320 in E-UTRA, T322 in UTRA and T3230 in GERAN), if configured, at inter-RAT cell (re)selection.

An RRC connection release procedure is described in detail. It may refer to a section 5.3.8.3 of 3GPP TS 36.331 V10.5.0 (March 2012).

When a UE receives an RRCConnectionRelease message, the UE shall perform as follows:

1> delay the following actions 60 ms from the moment the RRCConnectionRelease message was received or optionally when lower layers indicate that the receipt of the RRCConnectionRelease message has been successfully acknowledged, whichever is earlier;

1> if the RRCConnectionRelease message includes the idleModeMobilityControlInfo:
2> store the cell reselection priority rmation provided by the idleModeMobilityControlInfo;
2> if the t320 is included:
3> start timer T320, with the timer value set according to the value of t320;
1> else:
2> apply the cell reselection priority rmation broadcast in the system rmation;
1> if the releaseCause received in the RRCConnectionRelease message indicates loadBalancingTAURequired:
2> perform the actions upon leaving RRC_CONNECTED with release cause 'load balancing TAU required';
1> else if the releaseCause received in the RRCConnectionRelease message indicates cs-FallbackHighPriority:
2> perform the actions upon leaving RRC_CONNECTED with release cause 'CS Fallback High Priority';
1> else:
2> if the extendedWaitTime is present and the UE supports delay tolerant access:
3> forward the extendedWaitTime to upper layers;
2> perform the actions upon leaving RRC_CONNECTED with release cause other';

A UE action upon leaving RRC_CONNECTED is described in detail. It may refer to a section 5.3.8.12 of 3GPP TS 36.331 V10.5.0 (March 2012).

Upon leaving RRC_CONNECTED, the UE shall:
1> reset MAC;
1> stop all timers that are running except T320 and T330;
1> release all radio resources, including release of the RLC entity, the MAC configuration and the associated PDCP entity for all established RBs;
1> indicate the release of the RRC connection to upper layers together with the release cause;
1> if leaving RRC_CONNECTED was triggered neither by reception of the MobilityFromEUTRACommand message nor by selecting an inter-RAT cell while T311 was running:
2> enter RRC_IDLE and perform procedures;

A Cell selection procedure when leaving RRC_CONNECTED is described in detail. It may refer to a section 5.2.7 of 3GPP TS 36.304 V10.5.0 (March 2012).

On transition from RRC_CONNECTED to the RRC_IDLE, the UE shall attempt to camp on a suitable cell according to redirectedCarrierInfo, if included in the RRCConnectionRelease message. If the UE cannot find a suitable cell, the UE is allowed to camp on any suitable cell of the indicated RAT. If the RRCConnectionRelease message does not contain the redirectedCarrierInfo, the UE shall attempt to select a suitable cell on an EUTRA carrier. If no suitable cell is found according to the above, the UE shall perform a cell selection starting with stored information cell selection procedure in order to find a suitable cell to camp on.

When returning to the RRC_IDLE after the UE moved to RRC_CONNECTED state from camped on any cell state, the UE shall attempt to camp on an acceptable cell according to redirectedCarrierInfo, if included in the RRCConnectionRelease message. If the UE cannot find an acceptable cell, the UE is allowed to camp on any acceptable cell of the indicated RAT. If the RRCConnectionRelease message does not contain redirectedCarrierInfo, the UE shall attempt to select an acceptable cell on an EUTRA carrier. If no acceptable cell is found according to the above, the UE shall continue to search for an acceptable cell of any PLMN in state any cell selection.

An RRCConnectionRelease message is described in detail. It may refer to a section 6.2.2 of 3GPP TS 36.331 V10.5.0 (March 2012).

The RRCConnectionRelease message is used to command the release of an RRC connection. A signaling radio bearer for the RRCConnectionRelease message is a SRB1, and a logical channel for the RRCConnectionRelease message is a dedicated control channel (DCCH). The RRCConnectionRelease message is transmitted from the network to the UE.

Table 1 shows the RRCConnectionRelease message.

TABLE 1

-- ASN1START
RRCConnectionRelease ::= SEQUENCE {
rrc-TransactionIdentifier RRC-TransactionIdentifier,
criticalExtensions CHOICE {
c1 CHOICE {
rrcConnectionRelease-r8 RRCConnectionRelease-r8-IEs,
spare3 NULL, spare2 NULL, spare1 NULL
},
criticalExtensionsFuture SEQUENCE { }
}
}
RRCConnectionRelease-r8-IEs ::= SEQUENCE {
releaseCause ReleaseCause,
redirectedCarrierInfo RedirectedCarrierInfo OPTIONAL, -- Need ON
idleModeMobilityControlInfo IdleModeMobilityControlInfo OPTIONAL,
-- Need
OP
nonCriticalExtension RRCConnectionRelease-v890-IEs OPTIONAL
}
...
ReleaseCause ::= ENUMERATED {loadBalancingTAUrequired,
other, cs-FallbackHighPriority-v1020, spare1}
RedirectedCarrierInfo ::= CHOICE {
eutra ARFCN-ValueEUTRA,
geran CarrierFreqsGERAN,
utra-FDD ARFCN-ValueUTRA,
utra-TDD ARFCN-ValueUTRA,
cdma2000-HRPD CarrierFreqCDMA2000,
cdma2000-1xT CarrierFreqCDMA2000,
...,
utra-TDD-r10 CarrierFreqListUTRA-TDD-r10
}
...

Referring to Table 1, the releaseCause is used to indicate the reason for releasing the RRC connection. The cause value cs-FallbackHighPriority is only applicable when redirectedCarrierInfo is present with the value set to utra-FDD or utra-TDD. The redirectedCarrierInfo is redirection information indicating a carrier frequency (downlink for FDD) and is used to redirect the UE to an EUTRA or an inter-RAT carrier frequency, by means of the cell selection upon leaving RRC_CONNECTED.

An MBMS service is described in detail.

As a transport channel for an MBMS, an MCH can be mapped to an MCCH which is a logical channel for a control signal and an MTCH which is a logical channel for data. The MCCH can transmit an MBMS-related RRC message. The MTCH can transmit traffic of a specific MBMS service. A single MCCH channel may exist for every single multicast-broadcast single frequency network (MBSFN) for transmitting MBMS information and traffic. Alternatively, when a plurality of MBSFN areas are provided in a single cell, the UE may receive a plurality of MCCHs. When the MBMS-related RRC message is changed in a specific MCCH, the PDCCH can transmit an MBMS radio network temporary identity (M-RNTI) and an MCCH indicator indicating a specific MCCH. By receiving the M-RNTI and the MCCH indicator through the PDCCH, the UE supporting the MBMS can determine that the MBMS-related RRC message is changed in the specific MCCH and can receive the specific MCCH. An RRC message of the MCCH can be changed in every modification period, and can be repetitively broadcast in every repetition period.

While the UE receives the MBMS service, the UE may receive a dedicated service. For example, some users may watch TV through the MBMS service using smart phones at the same time while making a use of an instant messaging (IM) service using the smart phones. In this case, the MBMS service may be provided on the MTCH received by multiple UEs. A service provided to each UE respectively, such as the IM service, may be provided on a dedicated bearer such as the DCCH or a dedicated traffic channel (DTCH).

In an area, a specific BS may use multiple frequencies at the same time. For using radio resources efficiently, the network may provide the MBMS service on only one frequency among the multiple frequencies, and may provide dedicated bearers to each UE on all multiple frequencies. In this case, if the UE, which receives a service using the dedicated bearer in a frequency not providing the MBMS service, wants to receive the MBMS service, the UE may have to be handed over to a frequency providing the MBMS service.

For this, a network control option may be adopted as a basic architecture for handling the MBMS service. The network may be informed about UE's interest in the MBMS service by the UE, and then the network tries to ensure that the UE is able to receive the MBMS service. That is, if the UE would like to receive the MBMS service, the UE transmits an MBMS interest indication to the BS. The MBMS interest indication provides MBMS interest information at the level of a frequency rather than of an individual service, and indicates UE's interest in MBMS frequency reception. Upon receiving the MBMS interest indication from the UE, the BS acknowledges that the UE wants to receive the MBMS service, and makes the UE move to a frequency providing the MBMS service. The MBMS interest indication may indicate that the UE wants to receive the MBMS service. The MBMS interest indication may include information on the frequency which provides the MBMS service that the UE wants to receive. The UE may obtain the information on the frequency providing the MBMS service that the UE wants to receive, by receiving a system information block (SIB)-15 from a serving cell. The UE may transmit the MBMS interest indication whenever the UE's interest changes.

An MBMS service continuity is described. The UE who wants to receive a specific MBMS service acknowledges information on frequency and time on which the specific MBMS service is provided. When the MBMS service is on air or is going to be broadcast soon, the UE sets a priority of a frequency providing the MBMS service to the highest priority. The UE in the RRC_IDLE can move to a cell providing the MBMS service and receive the MBMS service by performing a cell reselection procedure using the frequency priority information which is set.

To ensure the MBMS service continuity, a serving cell should know about UE's interest in the MBMS service and it can be achieved through MBMS interest indication procedure. However, the MBMS indication procedure may be applied only to the 3GPP LTE rel-11, so legacy UE and eNB cannot support the MBMS interest indication procedure. That is, the legacy eNB cannot know the UE's interest in the MBMS service. When the UE which is interested in the MBMS service is released from the serving cell, the UE may be redirected to a frequency not providing the MBMS service even though the UE is interested with receiving the MBMS service. For a UE in the RRC_IDLE which is interested in the MBMS service but select and camp on a cell on the other-RAT frequency than the 3GPP LTE as a result of redirection, the UE cannot make the frequency providing the interested MBMS service the highest reselection priority. Though the UE establishes the RRC connection with the cell, the UE cannot inform the serving cell about its interest in the MBMS service. Therefore, if the UE is redirected to the other-RAT frequency, the UE will not be able to receive the MBMS service any longer.

To solve the problem described above for a UE which is interested in an MBMS service, a method for determining, by the UE, whether to ignore or apply redirection information may be proposed when the UE receives an RRC connection release message with the redirection information from a serving cell, and the serving cell intends to make the UE move to the other-RAT frequency.

Figure 6:
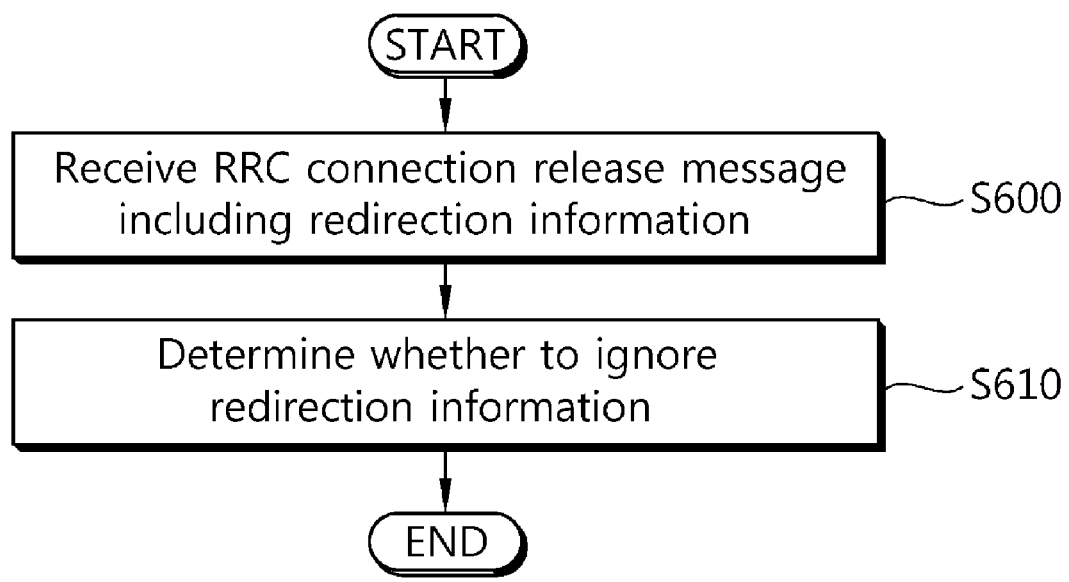
FIG. 6 shows an example of a method for determining whether to ignore redirect information or not according to an embodiment of the present invention.

FIG. 6 shows an example of a method for determining whether to ignore redirect information or not according to an embodiment of the present invention.

At step S600, a UE, which is receiving an MBMS service provided by a 3GPP LTE, receives an RRC connection release message including redirection information from a serving cell. At step S610, the UE determines whether to ignore the redirection information in the RRC connection release message.

The UE may ignore the redirection information in the RRC connection release message, and may perform a cell selection procedure. By ignoring the redirection information, the UE may be able to select and camp on a cell on a 3GPP LTE frequency providing the MBMS service, and then the UE will move to the cell providing the interested MSMS service by changing reselection priority. Accordingly, the UE can receive the MBMS service continuously in an RRC_IDLE.

The UE may ignore the redirection information in the RRC connection release message only in a certain case. First, the UE may ignore the redirection information according to the redirection information. That is, the UE may ignore the redirection information only when the redirected frequency indicated by the redirection information is different from a certain frequency the UE wants. The UE may ignore the redirection information only when the redirected frequency indicated by the redirection information is not a frequency providing the MBMS service in which the UE is interested. Or, the UE may ignore the redirection information only when the redirected frequency indicated by the redirection information is not a frequency used by the 3GPP LTE. More specifically, when the RedirectedCarrierInfo, which is the redirection information in the RRC connection release message, indicates 'ARFCN-ValueEUTRA' indicating the frequency used by the 3GPP LTE, the UE selects a cell on the frequency indicated by RedirectedCarrierInfo. After that, the UE will be able to make the frequency providing the interested MBMS service the highest reselection priority and perform a cell reselection procedure. Accordingly, the UE can receive the interested MBMS service. However, if the UE is redirected to a cell on the other-RAT frequency, the UE cannot prioritize the frequency providing the MBMS service. So, the UE may ignore RedirectedCarrierInfo when the frequency indicated by RedirectedCarrierInfo is the frequency used by the 3GPP LTE.

The UE may ignore the redirection information only when the UE considers a serving cell as a cell not supporting an MBMS interest indication procedure. Or, the UE may ignore the redirection information only when the UE does not inform the serving cell about its MBMS interest. That is, if the UE considers that the serving cell knows its MBMS interest, the UE does not ignore the redirection information. If the serving cell knows the UE's MBMS interest, the serving cell may not redirect the UE to the frequency not providing the interested MBMS service if possible. So when the serving cell redirects the UE to the frequency not providing the interested MBMS service even though the serving cell knows the UE's MBMS interest, it may not be desirable that the UE ignores the redirection information regardless of intention of the serving cell. The UE may know whether the serving cell supports the MBMS interest indication procedure by receiving a SIB from the serving cell. For example, if the serving cell broadcast a SIB-15, the UE considers the serving cell as a cell supporting the MBMS interest indication procedure. If the serving cell does not broadcast the SIB-15, the UE considers the serving cell as a cell not supporting the MBMS interest indication procedure.

The UE may decide whether to ignore the redirection information or not according to a release cause of the RRC connection release. For example, the UE ignores the redirection information only when the release cause in the received RRC connection release message is not 'cs-FallbackHighPriority'. In some case, the redirection is used for a unicast service continuity, e.g. a circuit switch fall-back (CSFB). In this case, the UE may suffer from disconnecting of the unicast service by ignoring the redirection information. Therefore, it is desirable that the UE does not ignore the redirection information when the redirection is triggered for the purpose of the unicast service continuity and the UE prefers the unicast service than the MBMS service.

The UE may decide whether to ignore the redirection information or not according to a user preference between a unicast service and the MBMS service. If the UE prefers the MBMS service to the unicast service, the UE may ignore the redirection information for receiving the MBMS service. On the other hand, if the UE prefers the unicast service than the MBMS service, the UE may not ignore the redirection information.

In addition, the serving cell may be able to allow or disallow the UE to ignore the redirection information by transmitting an indicator. The indicator may be transmitted included in the RRC message or the system information. When the UE receives the indicator which disallows ignoring the redirection information from the serving cell, the UE cannot ignore the redirection information even though the UE wants to receive the MBMS service on a certain frequency. The UE can ignore the redirection information only when the UE receives the indicator which allows ignoring the redirection information.

Meanwhile, though the UE interested in the MBMS service selects a cell on a redirected frequency according to the redirection information, if the UE changes reselection priority immediately after the redirection, the effect of redirection may be poor. Therefore, for the UE which is interested in the MBMS service but is prohibited from ignoring the redirection information, the UE does not change a reselection priority for a certain period after the redirection. After thee certain period, the UE can make the frequency providing interested MBMS service the highest reselection priority. The certain period may be configured by the serving cell or pre-configured.

Figure 7:
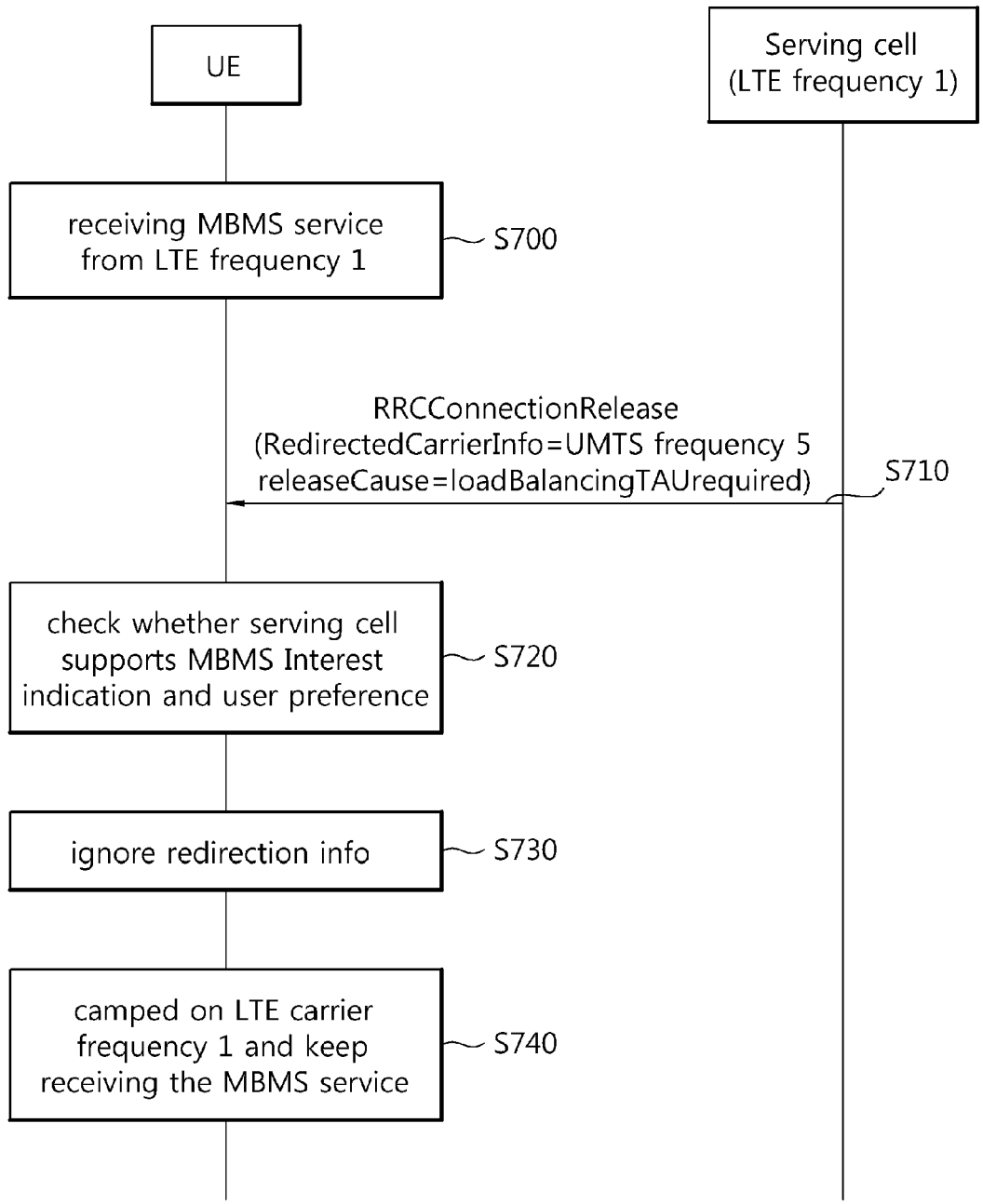
FIG. 7 shows another example of a method for determining whether to ignore redirect information or not according to an embodiment of the present invention.

FIG. 7 shows another example of a method for determining whether to ignore redirect information or not according to an embodiment of the present invention.

At step S700, a UE in RRC_CONNECTED receives an MBMS service from a serving cell. It is assumed that the serving cell operates at an LTE frequency 1. At step S710, the serving cell transmits an RRC connection release message to the UE. It is assumed that RedirectedCarrierInfo, which is redirection information, in the RRC connection release message indicates an UMTS frequency 5. Also, it is assumed that a release cause of the RRC connection release is loadBalancingTAUrequired.

At step S720, the UE checks whether the serving cell supports an MBMS interest indication procedure and checks a user preference between a unicast service and the MBMS service for receiving the MBMS service provided at the LTE frequency 1 continuously. If the serving cell does not support the MBMS interest indication procedure and the UE prefers the MBMS service to the unicast service, the UE ignores the redirection information in the RRC connection release message at step S730. At step S740, the UE in RRC_IDLE camps on the LTE frequency 1 and keep receiving the MBMS service.

Figure 8:
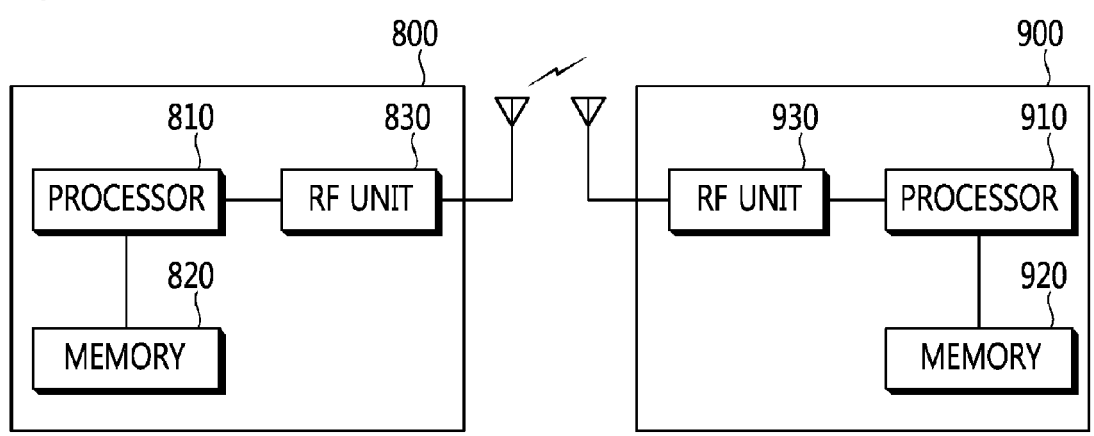
FIG. 8 is a block diagram showing wireless communication system to implement an embodiment of the present invention.

FIG. 8 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF unit 830, the first module 930, and the second module 940 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for selecting, by a user equipment (UE), a cell in a wireless communication system, the method comprising:
    receiving a radio resource control (RRC) connection release message including redirection information from a serving cell;
    determining whether to ignore the redirection information in the RRC connection release message according to a release cause of an RRC connection release and a user preference between a unicast service and a multimedia broadcast/multicast service (MBMS) service;
    ignoring the redirection information in the RRC connection release message if it is determined to ignore the redirection information; and
    selecting a cell on a third generation partnership project (3GPP) long-term evolution (LTE) frequency.

2. The method of claim 1, wherein it is determined to ignore the redirection information if a first frequency indicated by the redirection information is different from a second frequency.

3. The method of claim 2, wherein the second frequency is not a frequency providing the MBMS service in which the UE is interested.

4. The method of claim 2, wherein the second frequency is not a frequency used by 3GPP LTE.

5. The method of claim 1, wherein it is determined to ignore the redirection information if the UE does not inform the serving cell about an MBMS interest of the UE.

6. The method of claim 1, wherein it is determined to ignore the redirection information if the UE considers the serving cell as a cell not supporting an MBMS interest indication procedure.

7. The method of claim 1, wherein it is determined to ignore the redirection information if the UE prefers the MBMS service than the unicast service based on the user preference.

8. The method of claim 1, further comprising receiving, from the service cell, an indicator indicating whether to allow or disallow the UE to ignore the redirection information.

9. A user equipment (UE) in a wireless communication system, the UE comprising:
    a radio frequency (RF) unit configured to transmit or receive a radio signal; and
    a processor operably coupled to the RF unit,
    wherein the processor is configured to:
        receive a radio resource control (RRC) connection release message including redirection information from a serving cell;
        determine whether to ignore the redirection information in the RRC connection release message according to a release cause of an RRC connection release and a user preference between a unicast service and a multimedia broadcast/multicast service (MBMS) service;
        ignore the redirection information in the RRC connection release message if it is determined to ignore the redirection information; and
        select a cell on a third generation partnership project (3GPP) long-term evolution (LTE) frequency.

10. The UE of claim 9, wherein it is determined to ignore the redirection information if a first frequency indicated by the redirection information is different from a second frequency.

11. The UE of claim 9, wherein it is determined to ignore the redirection information if the UE does not inform the serving cell about an MBMS interest of the UE.

12. The UE of claim 9, wherein it is determined to ignore the redirection information if the UE considers the serving cell as a cell not supporting an MBMS interest indication procedure.

13. The UE of claim 9, wherein it is determined to ignore the redirection information if the UE prefers the MBMS service than the unicast service based on the user preference.

* * * * *